No. 728,977. PATENTED MAY 26, 1903.
L. RANCOULE.
COMBINED CAMERA, STEREOSCOPE, AND OPERA GLASS.
APPLICATION FILED JUNE 16, 1902.
NO MODEL. 2 SHEETS—SHEET 1.
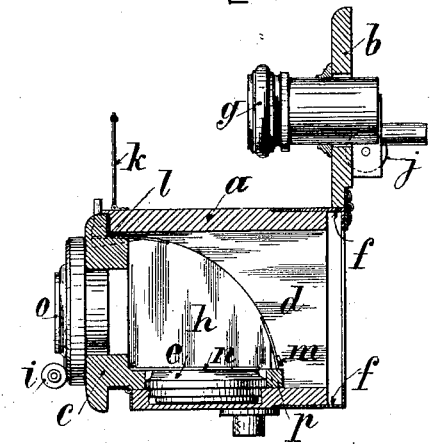
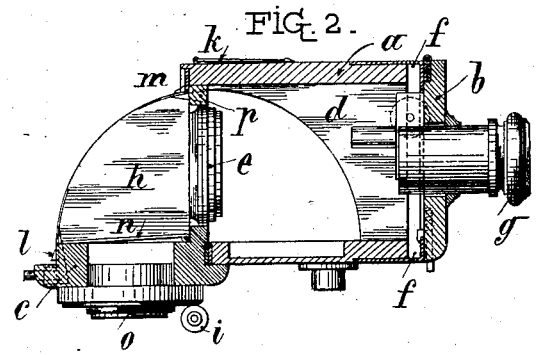
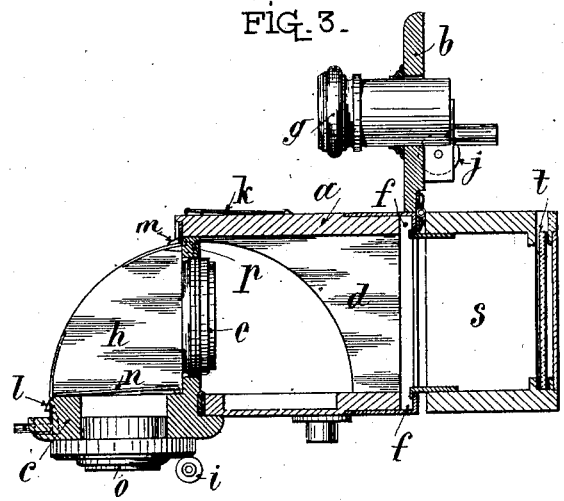

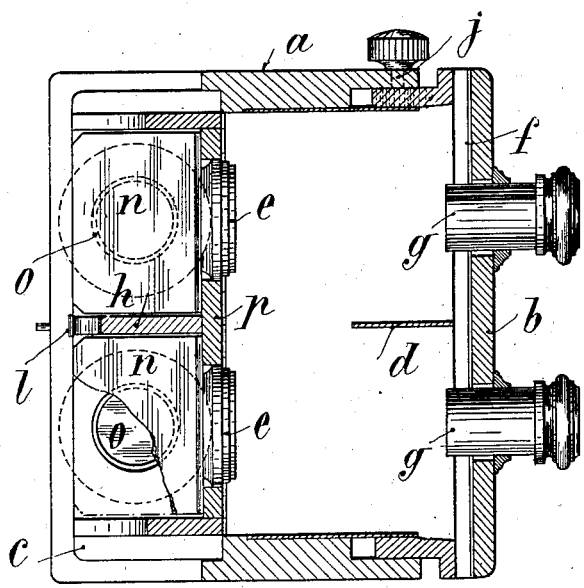

No. 728,977. Patented May 26, 1903.

UNITED STATES PATENT OFFICE.

LOUIS RANCOULE, OF PARIS, FRANCE.

COMBINED CAMERA, STEREOSCOPE, AND OPERA-GLASS.

SPECIFICATION forming part of Letters Patent No. 728,977, dated May 26, 1903.

Application filed June 16, 1902. Serial No. 111,987. (No model.)

*To all whom it may concern:*

Be it known that I, LOUIS RANCOULE, a citizen of the French Republic, residing at Paris, France, have invented certain new and useful Improvements in a Combined Camera, Stereoscope, and Opera-Glass, of which the following is a specification.

The present invention relates to an apparatus adapted to be used either as a photographic or stereoscopic device or as an opera or field glass.

In the drawings, Figure 1 is a vertical section of the apparatus constructed for photographic purposes. Fig. 2 is a vertical section of the same apparatus in the form for use as a field-glass. Fig. 3 shows the device in the form of a stereoscopic apparatus. Fig. 4 is a horizontal section of Fig. 2.

The apparatus consists of a camera or dark chamber $a$ of any convenient form and provided at both ends with hinged plates or doors $b$ $c$. One end plate, $b$, is provided with two lenses $g$, which can be adjusted to and fro in their support in the ordinary manner by means of a turn-screw $j$, according to the sight of the person using the apparatus. The other end plate, $c$, carries two objectives $o$ of ordinary stereoscopic apparatus and a shutter $i$ of any suitable construction. It is, moreover, provided with a plate $p$, rigidly secured to it at an angle of ninety degrees and provided with two large lenses $e$, preferably of the type used for the back lenses of ordinary opera or field glasses.

The chamber $a$ is provided with a longitudinal vertical partition $d$, dividing the camera into two equal parts, and the front end plate $c$ has a rib or a sector $h$ of small thickness, which constitutes the connection between it and the plate $p$ at ninety degrees and at the same time serves to complete the vertical partition $d$. This sector is provided with two resilient teeth or catches $l$ $m$, which form a locking device.

The front plate $c$ has two sheet-metal flaps adapted to cover the lenses $e$ when desired or necessary, Fig. 1.

The operation of the apparatus is as follows: If it is desired to use the apparatus for photographic purposes, the rear end plate $b$, Fig. 1, is turned upward and fixed by means of a spring or a hook and the front plate $c$ is closed. A plate-holder of any convenient construction or a similar device can then be introduced into the end $f$ of the chamber, and photographs can be taken upon manipulating the double shutter $i$. In this case the lenses $g$ on the rear plate can be used as a finder in combination with a sight $k$, hinged onto the top of the apparatus. In this use of the apparatus the flaps $n$ cover the large lenses $e$, and so prevent external light from below penetrating through them into the dark chamber.

If now it is desired to use the apparatus as field-glasses for viewing remote objects, the rear end plate $b$ is closed, as shown in Fig. 2, so as to place its glasses $g$ in position, and the other end plate $c$ is turned down about its hinges, so as to remove the photographic objectives $o$ and to substitute them by the lenses $e$, carried by the plate $p$ at ninety degrees. All that remains now is to use the glasses in the ordinary manner by looking through the glasses $g$ in the rear plate (which now becomes the front plate) and regulating the distance between the two sets of lenses by means of the button $j$, as in ordinary opera or field glasses.

Finally, as shown in Fig. 3, the apparatus can be used as a stereoscopic device by opening both end plates or doors $b$ $c$. A box or extension $s$, adapted for the introduction of the stereoscopic views $t$, and the lenses $e$, carried by the plate arranged at ninety degrees to the photographic lens-plate, are then used for the examination of the views. The extension $s$ can be a folding collapsible or bellows device, so as to allow of varying the distance between the photographs and the lenses.

It will be understood that the end plates $b$ and $c$ need not necessarily be mounted on hinges. In fact, they can both be made entirely removable, in which case the user of the apparatus replaces one by the other at will and as required. Finally this arrangement could also be applied to eyeglasses with a single lens, which can thereby be transformed into a photographic camera with a single objective or into a stereoscopic and field-glass device, as described. Moreover, the field-glasses with two lenses can be combined with a photographic camera with a single objective.

What I claim as my invention, and desire to secure by Letters Patent, is—

1. A combined photographic camera and field-glass comprising a dark chamber, means at its ends adapted to receive interchangeably the one end a field-glass eyepiece or a photographic plate or film holder, and the other end a field-glass object-lens, or a photographic lens, the body of the dark chamber being provided with a recess to receive one of the lenses when not in use, substantially as specified.

2. A combined photographic-camera field-glass and stereoscope comprising a dark chamber with a median partition, and means at the ends adapted to receive interchangeably the one end two field-glass eyepieces, a photographic plate or film holder, or a box to hold stereoscopic views, and the other end two field-glass object-lenses, the body of said dark chamber being provided with recesses to receive the lenses for the time being not in use, and covers for said lenses, or two photographic lenses substantially as specified.

3. In a combined photographic and optical apparatus and in combination a dark chamber having a receptacle to receive a photographic plate or film holder arranged at one end of the chamber, a shutter hinged on the same end carrying two field-glass eyepieces, a shutter hinged on the other end of the chamber carrying two field-glass objectives and a plate carrying two photographic lenses carried on a plate fixed rigidly to the shutter and at a right angle to the same, a middle partition to the chamber fixed partly to the chamber-walls and partly carried on the last-mentioned shutter, substantially as specified.

4. In a combined photographic and optical apparatus and in combination a dark chamber having a receptacle to receive a photographic plate or film holder arranged at one end of the chamber, a shutter hinged on the same end carrying two field-glass eyepieces, a shutter hinged on the other end of the chamber carrying two field-glass objectives, and a plate carrying two photographic lenses carried on a plate fixed rigidly to the shutter and at a right angle to the same, a middle partition to the chamber fixed partly to the chamber-walls and partly carried on the last-mentioned shutter, and a box to hold stereoscopic views adapted to engage one end of the chamber when the shutter carrying the field-glass eyepieces is swung away from the chamber.

In testimony whereof I have signed my name to this specification in the presence of two subscribing witnesses.

LOUIS RANCOULE.

Witnesses:
LOUIS SULLIGER,
EDWARD P. MACLEAN.